Patented Sept. 15, 1936

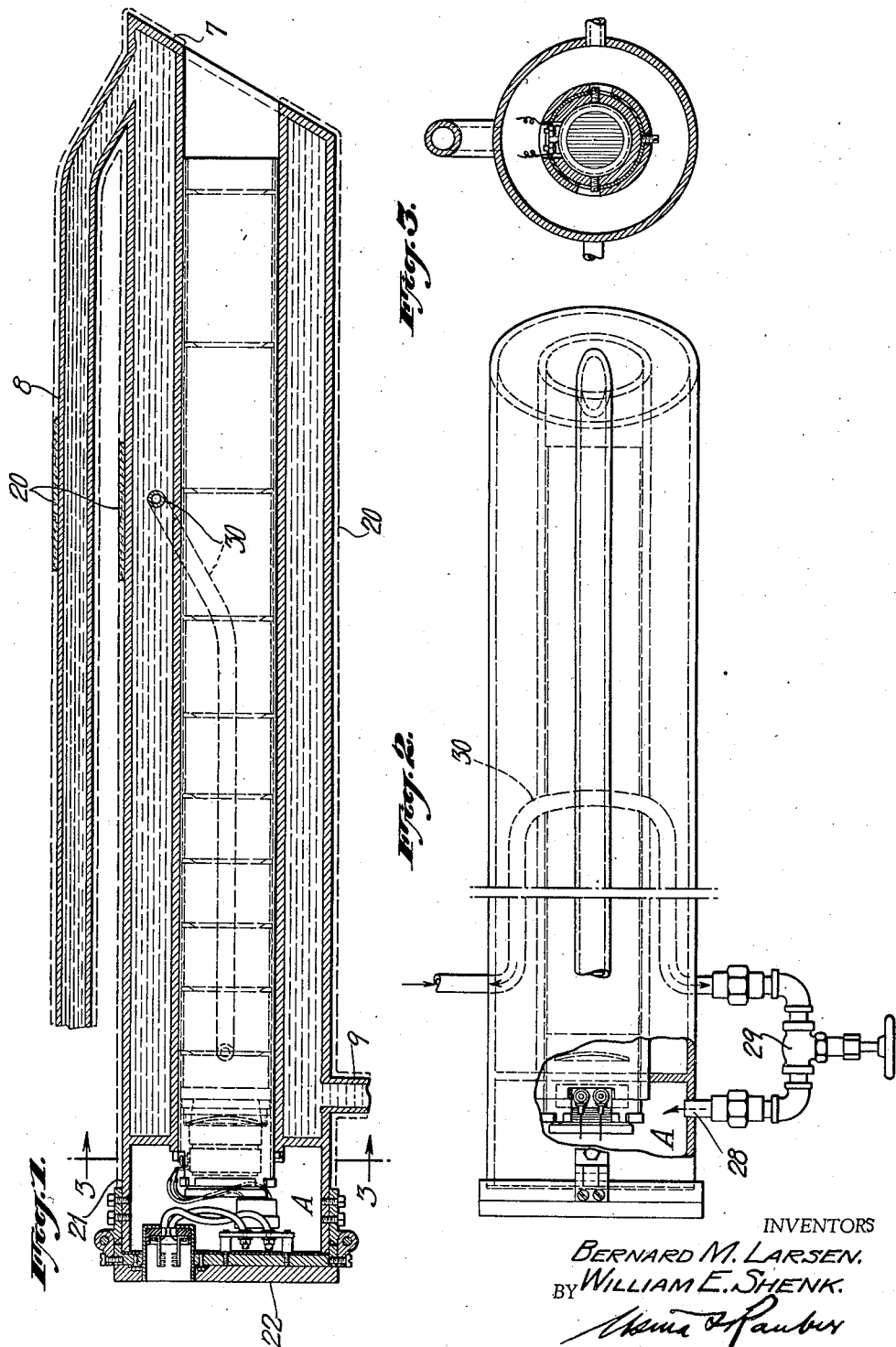

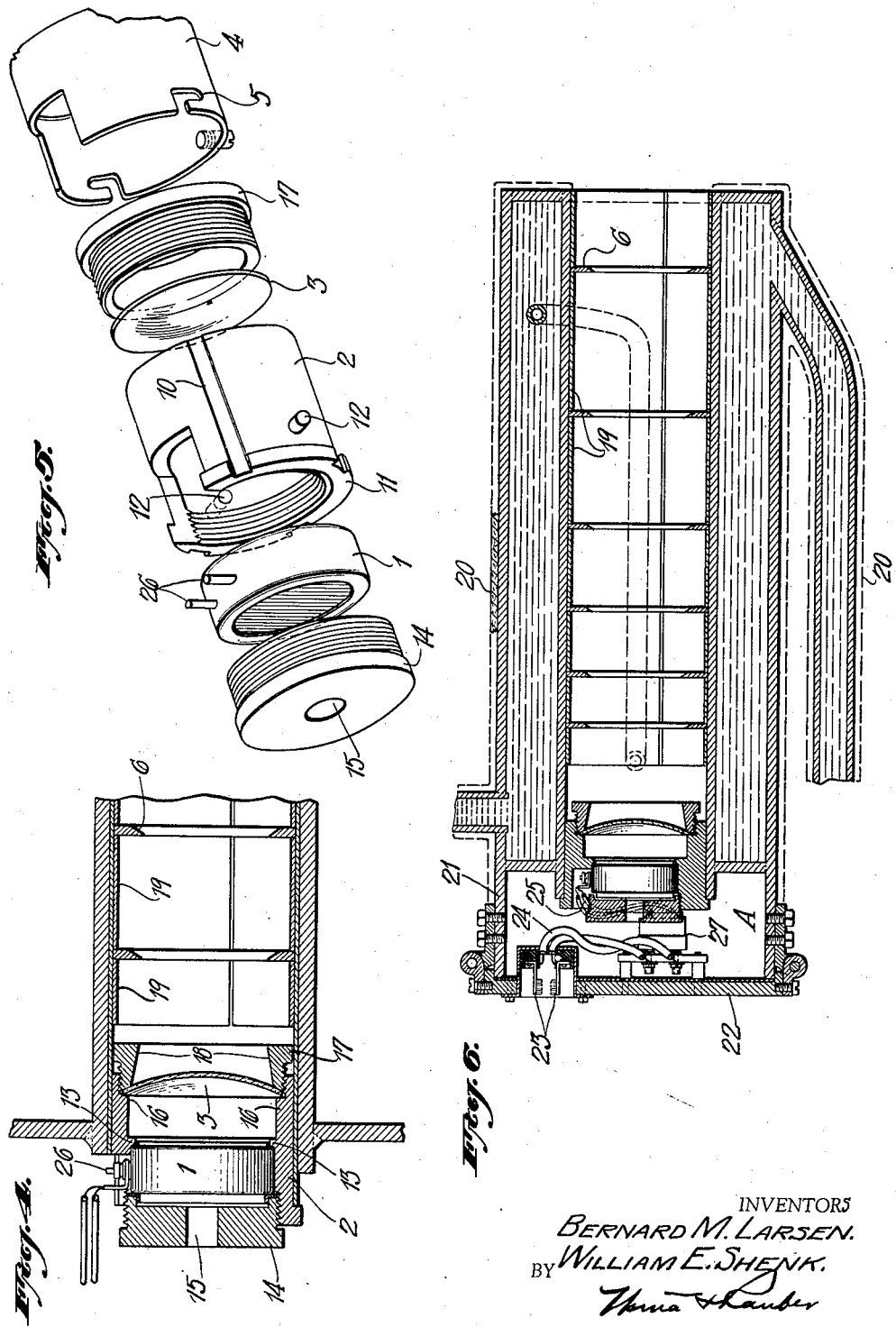

2,054,382

UNITED STATES PATENT OFFICE 2,054,382

RADIATION PYROMETER DEVICE

Bernard M. Larsen, Elizabeth, and William E. Shenk, East Orange, N. J., assignors to United States Steel Corporation, New York, N. Y., a corporation of New Jersey Application July 16, 1935, Serial No. 31,740

6 Claims. (Cl. 73—32)

This invention relates to temperature measuring devices and more particularly to radiation pyrometer devices.

One of the objects of the present invention is to provide a radiation pyrometer device suitable for the measurement of the radiant energy emitted by highly heated bodies. Another object is to provide a radiation pyrometer device adapted for use in connection with the melting and refining of steel. Still another object is to provide a suitable water and air cooled housing for a radiation sensitive element and means for filtering heat radiation from radiation falling on said element. Other objects and advantages will be apparent as the invention is more fully disclosed.

In accordance with the above objects, we have devised a radiation pyrometer device suitable for the purposes in view, which is especially suited for the housing and protection of various radiation-sensitive elements, as for example, those known in the art as photo-voltaic cells, and particularly a unit known as the "Photronic" cell.

A "Photronic" cell essentially comprises a metallic disc surfaced on one face with radiation sensitive material and having a metallic collector ring in contact with the radiation sensitive material. The metal disc forms one electrode and the collector ring the opposite electrode. When the radiation sensitive material is irradiated a difference of potential is set up between it and the neutral element, which causes a current to flow through any circuit connected to its terminals. It is usual to enclose the disc and collector ring in an insulating casing. An opening is provided in the casing through which the radiation sensitive material is irradiated and a relatively thin glass window is provided over the opening to protect the said material from mechanical injury.

Such radiation sensitive element is exceptionally well suited for the purposes of the present invention. The unit is small, rugged, simple and inexpensive and produces an external electric current approximately proportional to the amount of radiant energy of a certain wave length range falling upon the radiation sensitive surface thereof. The particular sensitivity range depends upon the composition of the radiation sensitive material employed. The cell does not need an evacuated space or contained liquid, which feature other devices. The radiation impinging on the sensitive surface does not produce any chemical or physical change in the material, but sets free electrons which move with a certain velocity and thus produce an electric current in an external circuit connected between the positive and negative electrodes. This current has almost a straight line relationship with the intensity of the radiation and can amount to as much as 350 micro-amperes for intense radiation, such as sunlight. The major difficulty involved in the use of the "Photronic" cell for the purposes of the present invention is that the light sensitive coating of this cell must be protected from over-heating above about 125° F. (50° C.). Above this temperature, the coating tends to soften and the usual effect thereof is to first raise the sensitivity of the device and then cause the sensitivity to drop off gradually.

In the design of pyrometer apparatus including the "Photronic" cell, the particular temperature measurement use to which it is to be put influences the specific details of structure. As one specific embodiment of the present invention, the structure devised for use in the measurement of temperatures of surfaces inside the melting chamber of a typical open hearth furnace will be described. As a second specific embodiment, the structure adapted for use in the measurement of the temperatures of checker brick in checker chambers will be described. The method of measuring and automatically regulating the temperature of an open hearth furnace by a radiation pyrometer device is that described and claimed in co-pending application Serial No. 31,735 filed July 16, 1935 by Lewis Rumford II.

In adapting a "Photronic" cell for this device, we have found that it is necessary to protect the said cell from radiant heat energy of the beam of radiation centered on the radiation sensitive device, and from condensation products and solid materials carried by gases escaping from said furnace as well as from direct hits from larger particles of slag and metal projected from the furnace through the opening in the wall thereof through which the pyrometer device is sighted, in addition to means to maintain the temperature of the cell below about 125° F. In adapting the device to the measurement of checker brick temperatures and to other service use wherein the projection of relatively large particles of material from the brick or furnace does not occur, the provision of means to protect the cell from projected particles may be omitted.

Before further disclosing the present invention, reference should be made to the accompanying drawings, wherein—

Fig. 1 is a longitudinal sectional view of the pyrometer device of the first specific embodiment of the present invention; Fig. 2 is a top view of the same partly in section; Fig. 3 is a cross-sectional view along plane 3—3 of Fig. 1; Fig. 4 is an enlarged section illustrating constructional features; Fig. 5 is a perspective view of the same; and Fig. 6 is a longitudinal section illustrating the structural features of a second specific embodiment of the present invention.

Referring to Figs. 1 to 5 inclusive, the pyrometer device of the present invention essentially is comprised of three parts or sections adapted to be assembled together into a compact unitary structure.

"Photronic" cell 1 (Fig. 5) is shown structurally as a unit. The specific structure of cell 1 forms no part of the present invention and as illustrated is to be construed as including the surfaced disc, collector ring and glass window elements hereinabove identified as being a part thereof.

The three parts or sections of the present invention comprises a "Photronic" cell holder 2 including a heat radiation filter 3; radiation tunnel 4 including means 5 to mount the said holder in one end thereof, means 6 to limit radiation passing therethrough to said holder to a beam of desired cross-sectional area, the said tunnel having a length proportioned with respect to its diameter adapted to prevent the passage therethrough of relatively large particles of materials having a curved projectory path; and a double walled cooling housing 7 enclosing the said holder and tunnel, the said housing being provided with means 8 and 9 to circulate a flow of cooling fluid therethrough; the entire assembly of three units being provided with means 10 to circulate clean cool air about the said holder and through the said tunnel to prevent the entrance of deleterious dust particles and condensible gases and vapors into the tunnel.

Cell holder 2 comprises substantially a tubular base element (2) having an outside diameter adapting the same to be recessed within tubular light tunnel 4 and having a shoulder 11 thereon to abut against the end of tunnel 4 and provided with pins 12 to coact with means 5 of tunnel 4 to secure the said holder in the end of tunnel 4.

The inside diameter of base 2 at one end approximates the outside diameter of cell 1 and an internal shoulder 13 is provided inwardly from the end against which the said cell may be abutted with the radiation sensitive surface toward the said light tunnel 4. End plug member 14 is provided to secure the cell 1 against shoulder 13.

The opposite end of base 2 is provided with an internal shoulder 16 against which the edges of radiation filter 3 may abut and end plug member 17 is provided to secure the said filter in position. End plug 17 is provided with a center opening 18 having a diameter at least sufficient to pass a beam of radiation of the maximum diameter to be employed in irradiating the sensitive surface of cell 1.

Light tunnel 4 is provided with a length proportioned with respect to its diameter such that relatively large particles of material such as molten slag and metal which are projected towards and into the open end thereof, would have difficulty in traversing the full length or depth to the holder 2 without first striking the wall of the tunnel, and being retained by the diaphragms 6. An ordinary laboratory watch glass may also be inserted between filter 3 and plug member 17 to catch occasional particles of molten metal, thus protecting filter 3 and cell from possible damage.

In the ordinary use of the present device in the measurement of the temperatures of an open hearth furnace by sighting the device through an opening in a wall of the furnace upon the inner surface of another wall, particles of slag and molten metal frequently are projected through the furnace wall opening. By spacing the open end of tunnel 4, a distance away from the said furnace wall opening, the chances of the projected particles striking the open end of tunnel 4 are minimized. However, frequently such particles do enter the open end of tunnel 4, but seldom with a substantially flat trajectory path. Accordingly, with any given diameter of opening, the length of tunnel 4 should at least be sufficient to protect the holder unit from any direct hits by such particles.

As an illustration, we have found that with about a two inch diameter opening the length of tunnel 4 should approximate thirty inches. The diameter of tunnel 4 is governed mainly by the diameter of the radiation sensitive element of cell 1. The usual diameter of such element approximates 1½ inches.

In addition to this, we provide means 6 along the interior length of tunnel 4 to limit the radiation traversing the tunnel 4 and falling upon the radiation sensitive element of cell 1, to direct radiation from the inner wall surface in the furnace, and to a definite cone or fraction of such radiation.

In such a fixture, with no lenses present to collect or concentrate the radiation entering it, it is necessary to limit the radiation falling upon the cell face to a definite fraction of all the radiation coming from the "visible" area of the furnace wall. In the design used here, we usually allow the whole area of the cell face to be exposed, but limit the radiation to a definite cone by fixing (1) the diameter of the opening in the diaphragms 6, and (2) the distance between the cell face and the diaphragm nearest to the open end of the fixture. With these conditions, the output from the cell is independent of the distance between fixture and the surface whose temperature is to be measured, since the intensity of radiation from any point decreases as the square of this distance, but the area "visible" to the cell increases as the square of this distance. The diaphragm openings are usually not less than 1.5 inches nor more than 3 inches.

Means 6 substantially comprises a plurality of washer or diaphragm elements or perforated discs having aligned openings of a fixed diameter.

These washers preferably are disposed in parallel spaced relation interiorly along the length of tunnel 4 in any convenient manner as by providing cylindrical spacer elements 19. We prefer to gradually reduce the spacing of these washers as they approach the cell holder unit from about a three inch spacing to about a one inch spacing, to eliminate substantially all stray and reflected radiation from the projected beam before striking the said cell 1.

Washer elements 6 also perform the function of intercepting projected particles of slag and metal entering the open end of tunnel 4 and preventing them from being deflected rearwardly towards cell 1.

Housing 7 preferably is a double walled tubular housing substantially as indicated, the spacing between the walls being sufficient to permit the circulation of a strong free flow of water therethrough at such a rate as will carry off all of the radiant heat energy striking the nose or open end thereof. As shown, it is preferable to supply the cold water to the nose and we have found also that it is advisable to cover the outside surface of the housing with heat insulating material 20 such as asbestos.

The outer wall of the rear end of the housing 7 is preferably extended, as indicated at 21, a distance and end closure means 22 is provided therefor to form an air chamber A. Terminals 23 extend through means 22 and flexible conductors 24 and 25 connect said terminals to the electrode terminals 26 of radiation device 1 through a common type of bayonet socket 27.

Air under pressure and substantially free from oil, water vapor and dust particles is supplied to chamber A through intake port 28 and the volume is regulated by valve 29. Before entering the chamber A, the air is cooled by passing the same through coil 30 disposed between the double walls of housing 7. After entering chamber A, the air passes along grooves 10 of base element 2 into the radiation tunnel 4 and thence out through the open end of tunnel 4. The pressure of air is maintained at least sufficient to prevent the entrance of furnace and atmospheric gases into tunnel 4. This protects the tunnel 4 and radiation filter 3 from radiation obscuring deposits of dust particles, water and condensible vapors and gases carried by the furnace and atmospheric gases.

The combination of elements hereinabove described effectively provide for the measurement of radiation emitted by the incandesced interior wall face of a furnace upon which the radiation sensitive device 1 is sighted, without deleterious overheating of the radiation sensitive material of the said device 1. We have found that by comprising filter 3 of material such as Jena glass B. G. 17, which passes only that radiation in the wave length range from 0.300 micron to 0.750 micron (visible radiation), the sensitivity of the device 1 is not particularly decreased. For example, a 3 millimeter thickness of such glass employed as filter 3 reduces the current output of device 1 by about 25%. By the use of this filter, the temperature of the radiation sensitive material during exposure to radiation from an open hearth furnace seldom increases more than 18–27° F. (10–15° C.) above the temperature of the cooling water, whereas without such filter, this increase may be 50–100° F. (28–55° C.)

In the modification illustrated in Fig. 6, a device useful in the determination of temperatures in situations wherein the hazard of direct hits by projected particles of molten materials is not present, is shown.

The essential difference between the device of Fig. 6 and that of Figs. 1 to 5 inclusive is that the depth or length of the tubular radiation tunnel 4 is shorter and the nose or open end of cooling housing 7 may be square rather than oblique, as shown in Fig. 1. The overhang of the upper section of the nose of housing 7 indicated in Fig. 1 is desirable to prevent particles of material from falling vertically downward in an arcuate path permitting the same to enter tunnel 4. The overhang should provide about a 60 degree angle rearwardly between top and bottom of housing 7.

The depth or length of tunnel 4 in the embodiment of Fig. 6 should be sufficient to provide for the concentration on device 1 of a beam of radiation projected from the incandescent surface and substantially free from radiation reflected or direct from any other source. We have determined that for most purposes this length of tunnel 4 from the cell face to the diaphragm should be not less than about 14–16 inches with diaphragm openings of 2.5 to 3 inches. Since in the applications of the embodiment of Fig. 6, the hazard of direct hits by molten metal particles is essentially absent, it is also unnecessary to make tunnel 4 a separate unit, and the diaphragms 6 may be fixed permanently in housing 7 by spacers 19. Otherwise, the devices of Figs. 1 to 5 inclusive and Fig. 6 are substantially identical.

Having broadly and specifically described the present invention and given two specific embodiments thereof, it is apparent that the same may be widely modified without departing essentially from the nature and scope thereof, and all such modifications are contemplated as may fall within the scope of the following claims.

What we claim is:

1. A radiation pyrometer device including in combination a radiation tunnel, a photovoltaic cell disposed in one end of said tunnel and means to prevent deleterious absorption of heat radiation by said cell and tunnel and means to filter heat radiation from radiation traversing the length of said tunnel before reaching said cell.

2. A radiation pyrometer device including in combination a radiation tunnel, a photovoltaic cell disposed in one end of said tunnel and means to prevent deleterious absorption of heat radiation by said cell and tunnel, said means comprising a water cooled jacket enclosing said tunnel and cell, means to restrict radiation traversing the length of said tunnel to a definite fraction of the radiant energy leaving the surface whose temperature is to be measured, means to filter out heat radiation from radiation traversing said straight line path, and means to maintain a pressure of cooled air through the said tunnel counter-current to the direction of radiation therethrough.

3. A radiation pyrometer device including in combination a radiation tunnel, a photovoltaic cell disposed in one end of said tunnel, the depth of said tunnel from the open end thereof to the face of said cell being proportioned with respect to the diameter thereof to limit the projection of solid particles therethrough to those following a substantially flat path of projection, and means to prevent deleterious absorption of heat radiation by said cell and tunnel, said means comprising a water cooled jacket enclosing said tunnel and cell, means to restrict radiation traversing the length of said tunnel to a definite fraction of the radiant energy leaving the surface whose temperature is to be measured, means to filter out heat radiation from radiation traversing said straight line path, and means to maintain a pressure of cooled air through the said tunnel counter-current to the direction of radiation therethrough.

4. In combination, a photovoltaic cell, a tubular radiation tunnel therefor and means to secure said cell in end closing relationship to said tunnel, a heat radiation filter and means to support said filter in said tunnel ahead of said cell, a plurality of apertured disc elements in parallel spaced relationship along the interior length of said tunnel, the apertures of said discs being of substantially equal diameter with the center axis thereof coinciding with the longitudinal axis of said tunnel, a tubular double walled jacket enclosing said tunnel provided with means to circulate water therethrough, and means to supply a pressure of cooled air through said tunnel towards the open end thereof.

5. In combination, a photovoltaic cell, a tubular radiation tunnel therefor and means to secure said cell in end closing relationship to said tunnel, a heat radiation filter and means to support said filter in said tunnel ahead of said cell, a plurality of apertured disc elements in parallel spaced relationship along the interior length of said tunnel, the apertures of said discs being of substantially equal diameter with the center axis thereof coinciding with the longitudinal axis of said tunnel, the spaced relationship between said discs gradually decreasing with each disc inwardly from the open end of said tunnel, a tubular double walled jacket enclosing said tunnel provided with means to circulate water therethrough, and means to supply a pressure of cooled air through said tunnel towards the open end thereof.

6. In combination a photovoltaic cell, a radiation filter and a holder therefor, said holder comprising a tubular base element having a shouldered recess in one end thereof within which said cell is adapted to be seated with the radiation sensitive face thereof towards the opposite end of the said base, and end closure means to retain said cell against said shoulder, a shouldered aperture in the opposite ends within which said radiation filter is adapted to be seated, and end closure means therefor to retain said filter in said recess without obstructing the passage of radiation therethrough to the other end of said base element.

BERNARD M. LARSEN.
WILLIAM E. SHENK.